US006393443B1

(12) United States Patent
Rubin et al.

(10) Patent No.: US 6,393,443 B1
(45) Date of Patent: May 21, 2002

(54) METHOD FOR PROVIDING COMPUTERIZED WORD-BASED REFERENCING

(75) Inventors: Moshe Rubin; Daniel Brief; Asher Szmulewicz; Moshe Matitya; Moshe Kranc, all of Jerusalem; Jeff Schneiderman, Maale Michmas; Elena Neroslavskaya, Tekoa, all of (IL)

(73) Assignee: Atomica Corporation, Burlingame, CA (US)

( * ) Notice: Subject to any disclaimer, the term of this patent is extended or adjusted under 35 U.S.C. 154(b) by 0 days.

(21) Appl. No.: 09/127,981

(22) Filed: Aug. 3, 1998

(30) Foreign Application Priority Data

Aug. 3, 1997 (IL) .................................. 121457

(51) Int. Cl.⁷ .............................................. G06F 17/21
(52) U.S. Cl. ....................................... 707/533; 707/532
(58) Field of Search .............................. 704/2, 3, 4, 5; 707/532, 533, 535, 536

(56) References Cited

U.S. PATENT DOCUMENTS

| | | | |
|---|---|---|---|
| 4,774,666 A | * 9/1988 | Miyao et al. .................. 704/2 |
| 4,882,681 A | * 11/1989 | Brotz ............................. 704/3 |
| 5,195,032 A | * 3/1993 | Matsui et al. .................. 704/5 |
| 5,384,701 A | * 1/1995 | Stentiford et al. ............. 704/3 |
| 5,396,419 A | 3/1995 | Morimoto ....................... 704/2 |
| 5,416,903 A | * 5/1995 | Malcolm .................... 345/333 |
| 5,517,409 A | * 5/1996 | Ozawa et al. .................. 704/3 |
| 5,523,943 A | 6/1996 | Maruta et al. ................. 704/4 |
| 5,541,837 A | 7/1996 | Fushimoto ..................... 704/2 |
| 5,587,902 A | * 12/1996 | Kugimiya ...................... 704/2 |
| 5,606,498 A | * 2/1997 | Maruta et al. ................. 704/7 |
| 5,612,872 A | * 3/1997 | Fujita ............................ 704/2 |
| 5,649,221 A | * 7/1997 | Crawford et al. ........... 707/532 |
| 5,649,222 A | * 7/1997 | Mogilevsky ................. 707/533 |
| 5,659,769 A | * 8/1997 | Kida et al. ................... 707/530 |
| 5,765,180 A | * 6/1998 | Travis ......................... 707/533 |
| 5,787,451 A | * 7/1998 | Mogilevsky ................. 707/533 |
| 5,848,386 A | * 12/1998 | Motoyama ..................... 704/5 |
| 5,859,636 A | * 1/1999 | Pandit ......................... 345/335 |
| 5,882,202 A | * 3/1999 | Sameth et al. ............... 434/157 |
| 5,884,246 A | * 3/1999 | Boucher et al. ............... 704/2 |
| 5,907,680 A | * 5/1999 | Nielsen ....................... 709/228 |
| 5,978,754 A | * 11/1999 | Kumano ........................ 704/3 |
| 6,012,075 A | * 1/2000 | Fein et al. ................... 707/540 |
| 6,154,757 A | * 11/2000 | Krause et al. ............... 707/530 |

OTHER PUBLICATIONS

Chen, Steven C. M. "Characters do the talking in Chinese–English Dictionary." Computer Shopper, Apr. 1995. vol. 15, No. 4. Ziff–Davis Publishing ©1995. p. 216.*

(List continued on next page.)

Primary Examiner—Stephen S. Hong
(74) Attorney, Agent, or Firm—Finnegan, Henderson, Farabow, Garrett & Dunner, L.L.P.

(57) ABSTRACT

A method for providing computerized word-based referencing including the steps of indicating a target word on a display, thereby causing a computer to identify the target word on the display by employing at least one of a text drawing function and a character recognition function in order to automatically identify at least one entry for the target word in at least one computerized data base based on the target word and additionally based on at least one word appearing in a vicinity thereof on the display to eliminate ambiguity in meaning in the target word; and displaying the at least one entry for the target word from the at least one computerized database on the display.

12 Claims, 6 Drawing Sheets

OTHER PUBLICATIONS

Rash, Wayne. "Word Processing Tools." Windows Sources, Mar. 1994. vol. 2, No. 3. Ziff–Davis Publishing. ©1994. p. 194.*

Brenesal, Barry. "Poyglot Lexica Perfects Translations." Computer Shopper, Sep. 1992. vol. 12, No. 9. Coastal Associates Publishing. ©1992. p. 697.*

Gold, Steve. "UK: Wordstar Previews Version 7.0 of Wordstar WP Software." Newsbytes, Feb. 19, 1992. Newsbytes Inc. ©1992.*

Torgan, Emerson Andrew. "Wordstar Offers Five Languages On the Fly." PC Magazine, Feb. 11, 1992. vol. 11, No. 3. Ziff–Davis Publishing. ©1992. p. 66.*

Grevstad, Eric. "Words of Wisdom." PC Sources, Jan. 1992. vol. 3 No. 1. Coastal Associates Publishing L.P. ©1992. p. 475.*

Brochure: Data Sheet Published by Techno Craft Ltd. entitled "ROBOWORD", May 9, 1997.

* cited by examiner

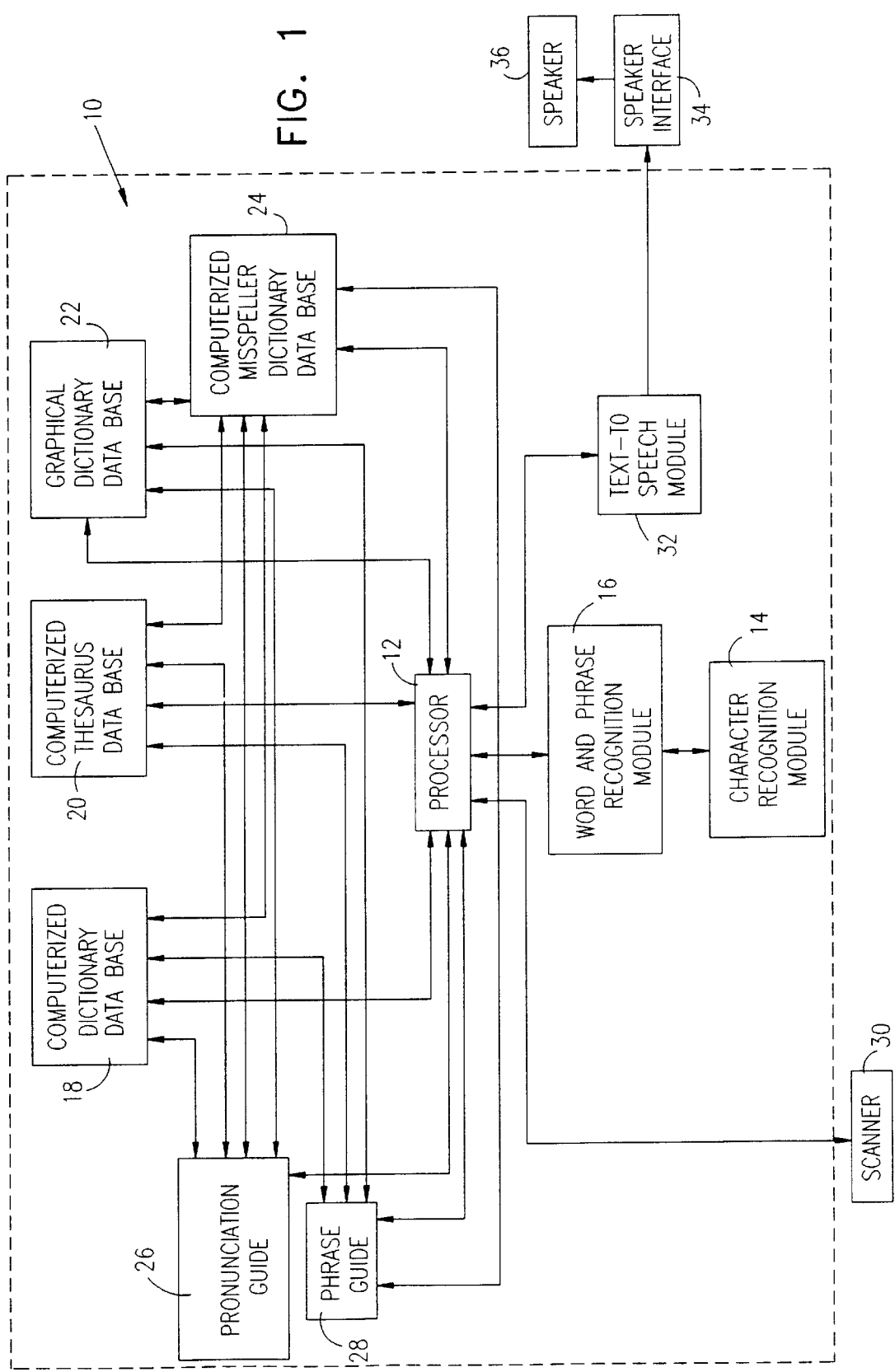

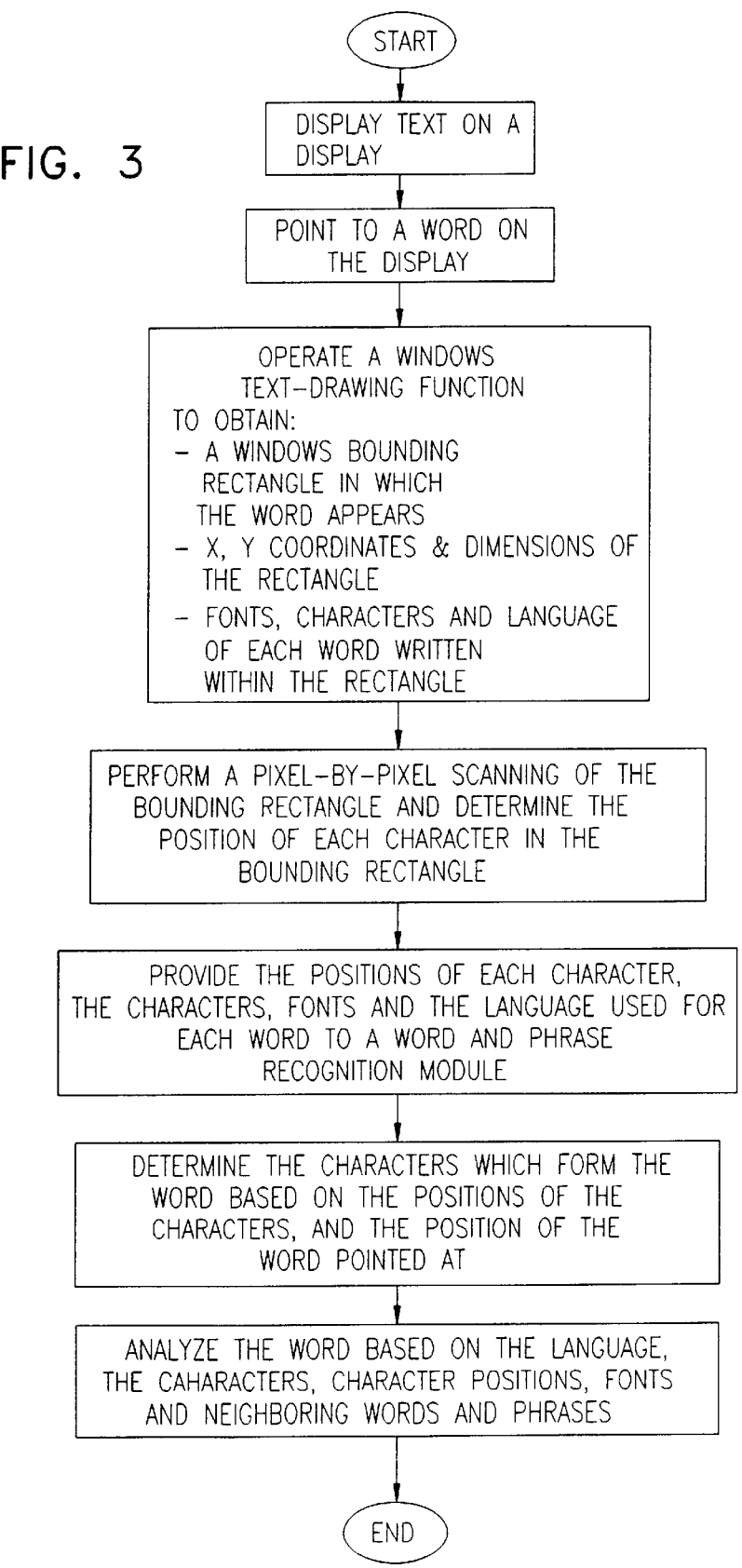

METHOD FOR PROVIDING COMPUTERIZED WORD-BASED REFERENCING

FIELD OF THE INVENTION

The present invention relates to electronic dictionary and thesaurus tools generally and more particularly to applications which allow automatic retrieval of information from computerized electronic dictionary and thesaurus tools.

BACKGROUND OF THE INVENTION

In typical applications of electronic dictionaries, a user is invited to type a word and to instruct an electronic dictionary to provide a translation of the word. Thus, during typing, each time the user looks for a translation of a word, he must interrupt typing and look for the word in the electronic dictionary.

In order to overcome such inconvenience, computerized dictionary and thesaurus tools which allow users to address computerized dictionaries interactively during typing and to employ the dictionaries in conjunction with automatic word recognition tools are required.

In a data sheet published by TechnoCraft Co. Ltd. on May 9, 1997, a product entitled "Roboword" is described. The Roboword is a multilingual dictionary tool which enables a user to point a mouse to any word on the computer screen, and the definition of the word will pop up immediately under the mouse pointer.

SUMMARY OF THE INVENTION

The present invention seeks to provide computerized dictionary and thesaurus tools which are applied with automatic word recognition tools.

There is thus provided in accordance with a preferred embodiment of the present invention a method for providing computerized translation of words including:

placing a pointer at a first region on a display;

detecting a string of characters displayed in the first region;

determining, in the string of characters, a word written in a first language by identifying an entry for the word in a computerized dictionary data base;

obtaining a translated word, representing a translation of the word in a second language, from the computerized dictionary data base; and displaying the translated word at a second region on the display.

Additionally, the method also includes the steps of:

retrieving at least one of a synonym and an antonym to the word in the second language from a computerized thesaurus data base; and displaying the at least one of a synonym and an antonym at a third region on the display.

Further additionally, the method also includes the steps of:

retrieving at least one of a picture, a drawing and an icon corresponding to the word from a graphical dictionary data base; and displaying the at least one of a picture, a drawing and an icon at a selected region on the display.

Preferably, the method also includes the steps of:

if the word is not found in at least one of the computerized dictionary data base, the computerized thesaurus data base, and the graphical dictionary data base, automatically searching a computerized misspeller dictionary data base in the second language for a match of the word to a represented misspelled word in the computerized misspeller dictionary data base; and displaying a correctly spelled word in the second language which corresponds to the word at a fourth region on the display.

Additionally, the method also includes the step of displaying a message indicating that the word is misspelled, and that a correct spelling of the word includes the correctly spelled word.

Preferably, the determining step includes:

performing a spell-check on the word versus at least one of the computerized dictionary data base, the computerized thesaurus data base and the computerized misspeller dictionary data base;

determining that there is no entry for the word if the spell-check outputs an error indicating that the word is not found in any of the computerized dictionary data base, the computerized thesaurus data base and the computerized misspeller dictionary data base; and determining that there is an entry for the word if the spell-check outputs an indication that the word is found in at least one of the computerized dictionary data base, the computerized thesaurus data base and the computerized misspeller dictionary data base.

Preferably, the step of determining that there is no entry for the word includes the step of displaying a message indicating that there is no entry available for the word on the display.

Additionally, the method also includes the step of displaying a message indicating that there is no text in the first region if the first region is a blank area.

Further additionally, the method includes the step of displaying an unrecognized word message if the first region includes an item which does not include a text.

Preferably, at least two of the following regions: the second region, the third region, and the fourth region include a common area. The second region and the third region may preferably include a common area.

In accordance with a preferred embodiment of the present invention the method also includes the step of linking at least one of the computerized dictionary data base, the computerized thesaurus data base, the graphical dictionary data base and the computerized misspeller dictionary data base to a pronunciation guide for providing a pronunciation of the word.

Additionally, the method also includes the step of linking at least one of the computerized dictionary data base, the computerized thesaurus data base, the graphical dictionary data base and the computerized misspeller dictionary data base to a phrase guide to retrieve at least a phrase which includes the word.

Further additionally, the method also includes the step of providing a coding scheme which indicates which one of the computerized dictionary data base and the computerized thesaurus data base is currently activated.

Preferably, the coding scheme includes at least one of a color coding and a letter coding of a selection icon which is employed to select one of the following data bases: the computerized dictionary data base, the computerized thesaurus data base, the graphical dictionary data base and any combination thereof.

In accordance with a preferred embodiment of the present invention the first language is identical to the second language, and the translated words includes a meaning of the word.

Preferably, the detecting step includes:

selecting a first window in which translation of words is required, and a second window in which translation of words is not required; and ignoring text written in the first region, if the first region is in the second window, and detecting a string of characters displayed in the first region, if the first region is in the first window.

Additionally, the method also includes the steps of:

providing a grammar analysis of the word; and displaying results of the grammar analysis on the display.

There is also provided in accordance with a preferred embodiment of the present invention a method for providing thesaurus data corresponding to selected words, the method including:

placing a pointer on a first region on a display;

detecting a string of characters displayed in the first region;

determining, in the string of characters, a word written in a first language by identifying an entry for the word in a computerized thesaurus data base;

obtaining at least one of a synonym and an antonym to the word in the second language from the computerized thesaurus data base; and displaying the at least one of a synonym and an antonym to the word in the second language at a second region on the display.

Further in accordance with a preferred embodiment of the present invention there is provided a method for providing a computerized translation of a word including:

scanning a text to obtain a scanned text;

placing a pointer at a first region on a display which includes a portion of the scanned text;

operating a character recognition procedure to detect a string of characters displayed in the first region;

determining, in the string of characters, a word written in a first language by identifying an entry for the word in a computerized dictionary data base;

retrieving a translated word, representing a translation of the word in a second language, from the computerized dictionary data base; and displaying the translated word at a second region on display.

Preferably, the scanned text includes an image of the text. The text may preferably include a handwritten text, and the scanned text may include an image of the handwritten text.

There is also provided in accordance with a preferred embodiment of the present invention a method for providing character and word recognition of a word pointed at by a pointer, the word being located in a bounding rectangle which includes a plurality of words printed in at least one language and in at least one format, the method including:

obtaining coordinates and dimensions of the bounding rectangle, the at least one language, the at least one format and characters which form each of the plurality of words;

scanning the bounding rectangle to obtain at least locations of each of characters which form the word;

determining the characters which form the word based on at least one of the locations of each of the characters which form the word, the coordinates and dimensions of the bounding rectangle, the at least one language and the at least one format; and identifying the word based on the determining step.

The at least one format may preferably include a font format.

Preferably, the scanning step includes scanning the bounding rectangle to obtain locations of each of characters which form words in the vicinity of the word, and the identifying step includes the step of identifying the word based at least one of the locations of each of the characters which form words in the vicinity of the word, the coordinates and dimensions of the bounding rectangle, the at least one language and the at least one format.

Further preferably, the word includes a series of characters written in a first language, and the identifying step includes distinguishing between characters in the series of characters which have similar structures to characters written in a second language by determining that the word is written in the first language.

In a case that the word is partly covered, the identifying step may include identifying the partly covered word by determining the characters which form the word.

Preferably, the word includes special characters, such at least one of the following special characters: colored characters; bold characters; characters written in italics; characters having different sizes; characters having different font types; and overstrike characters, and the identifying step includes identifying the special characters by determining the characters which form the word.

There is also provided in accordance with a preferred embodiment of the present invention a computerized translator including:

a character recognition module which is operative to detect a string of characters displayed at a first region on a display which is selected by a user, and to determine, in the string of characters, a word written in a first language;

a computerized dictionary data base; and a processor coupled to the character recognition module and to the computerized dictionary data base, and operative to determine whether there is an entry for the word in the computerized dictionary data base, to retrieve from the computerized dictionary data base a translated word, representing a translation of the word in a second language, and to display the translated word at a second region on the display.

Additionally, the computerized translator includes a computerized thesaurus data base which is coupled to the processor, wherein the processor is operative to obtain at least one of a synonym and an antonym to the word in the second language from the computerized thesaurus data base, and to display the at least one of a synonym and an antonym in the second language at a third region on the display.

Preferably, the computerized translator includes a computerized misspeller dictionary data base in the second language which is coupled to the processor, wherein the processor is operative, upon determination that the word is not found in at least one of the computerized dictionary data base and the computerized thesaurus data base, to search the computerized misspeller dictionary data base for a match of the word to a corresponding misspelled word in the computerized misspeller dictionary data base, and to display a correctly spelled word in the second language, which corresponds to the word, at a fourth region on the display.

Additionally, the computerized translator includes a pronunciation guide which is linked to at least one of the computerized dictionary data base, the computerized thesaurus data base, and the computerized misspeller dictionary data base, and is operative to provide a pronunciation of the word.

Further additionally, the computerized translator includes a phrase guide which is linked to at least one of the computerized dictionary data base, the computerized thesaurus data base, and the computerized misspeller dictionary data base, and is operative to provide at least a phrase which includes the word.

In accordance with a preferred embodiment of the present invention there is also provided a computerized translator including:

- a scanner for scanning a text to obtain a scanned text;
- a character recognition module which is coupled to the scanner and is operative to detect a string of characters displayed at a first region on a display which is selected by a user and includes a portion of the scanned text, and to determine, in the string of characters, a word written in a first language;
- a computerized dictionary data base; and
- a processor coupled to the scanner, to the character recognition module and to the computerized dictionary data base, and operative to determine whether there is an entry for the word in the computerized dictionary data base, to retrieve from the computerized dictionary data base a translated word, representing a translation of the word in a second language, and to display the translated word at a second region on the display.

Preferably, the scanned text includes an image of the text. The text may preferably include a handwritten text, and the scanned text may include an image of the handwritten text.

BRIEF DESCRIPTION OF THE DRAWINGS

The present invention will be understood and appreciated more fully from the following detailed description, taken in conjunction with the drawings in which:

FIG. 1 is a generalized block diagram illustration of a preferred implementation of a computerized translator constructed and operative in accordance with a preferred embodiment of the present invention;

FIG. 3 is a generalized flow chart illustrating a preferred method for providing character and word recognition in accordance with a preferred embodiment of the present invention.

DETAILED DESCRIPTION OF PREFERRED EMBODIMENTS

Figure 2A:
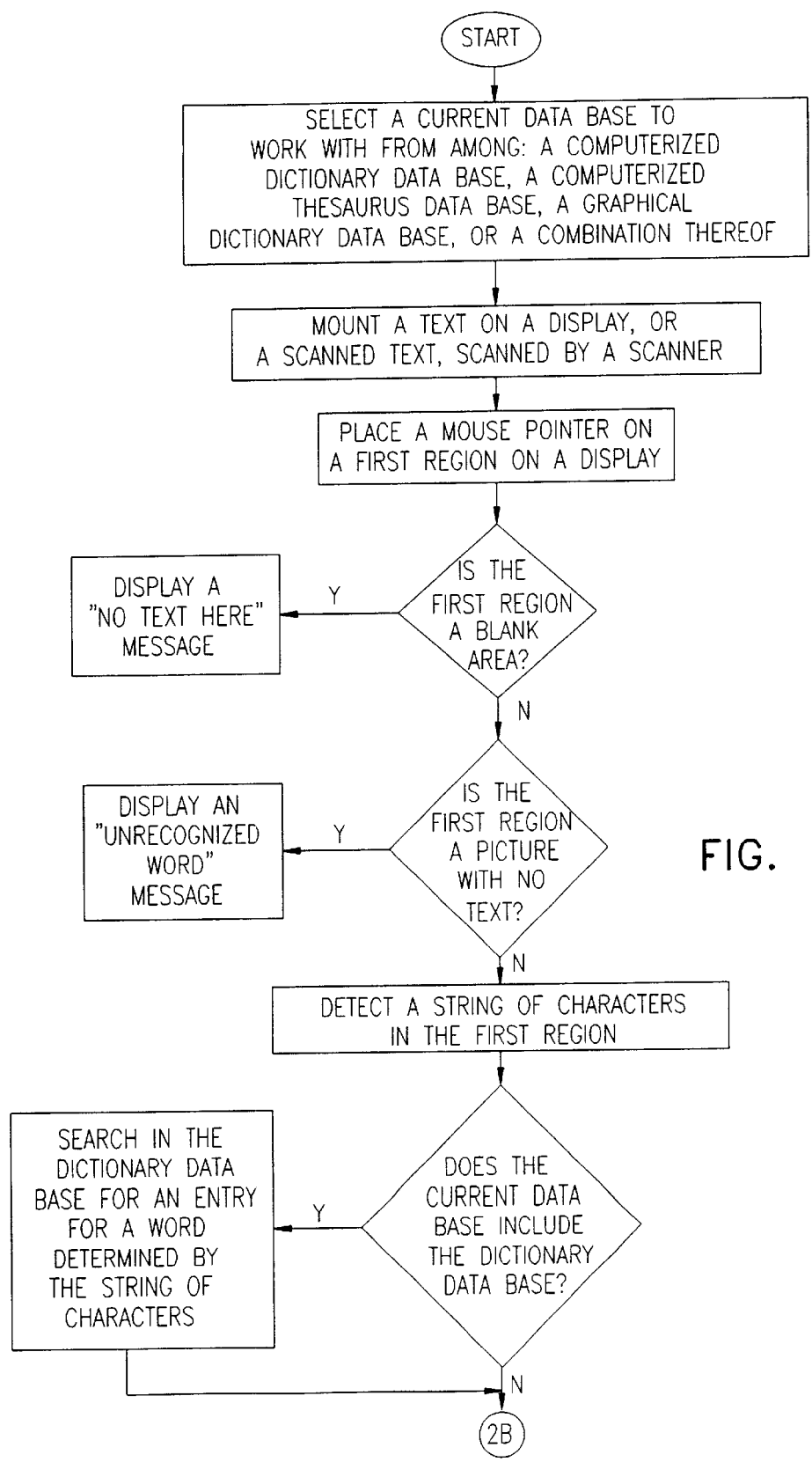
FIGS. 2A–2D together constitute a generalized flow chart illustrating a preferred method for retrieving data from dictionary and thesaurus data bases which is operative with the computerized translator of FIG. 1.

Reference is now made to FIG. 1, which is a generalized block diagram illustration of a preferred implementation of a computerized translator 10 constructed and operative in accordance with a preferred embodiment of the present invention.

Preferably, the computerized translator 10 includes a processor 12, a character recognition module 14, a word and phrase recognition module 16, and a computerized dictionary data base 18. The character recognition module 14 is coupled to the word and phrase recognition module 16, and the word and phrase recognition module 16 is coupled to the processor 12. Preferably, the computerized dictionary data base 18 is also coupled to the processor 12.

In a preferred embodiment of the invention the computerized translator 10 may also include a computerized thesaurus data base 20, a graphical dictionary data base 22, a computerized misspeller dictionary data base 24, a pronunciation guide 26 and a phrase guide 28 which are each coupled to the processor 12. It is appreciated that the computerized thesaurus data base 20 and the graphical dictionary data base 22 may form part of the computerized dictionary data base 18. Alternatively or additionally, the computerized dictionary data base 18, the computerized thesaurus data base 20, the graphical dictionary data base 22, the computerized misspeller dictionary data base 24, the pronunciation guide 26 and the phrase guide 28 may be all comprised in a single data base (not shown).

Preferably, the pronunciation guide 26 and the phrase guide 28 are each coupled to each of the following data bases: the computerized dictionary data base 18; the computerized thesaurus data base 20; the graphical dictionary data base 22; and the computerized misspeller dictionary data base 24. The computerized misspeller data base 24 is preferably coupled to the computerized dictionary data base 18, to the computerized thesaurus data base 20 and to the graphical dictionary data base 22.

The computerized translator 10 may also preferably include a text-to-speech module 32 which is preferably coupled to the processor 12 and to a speaker interface 34. The speaker interface 34 is preferably coupled to a speaker 36. It is appreciated that the speaker interface 34 and the speaker 36 may preferably be external to the computerized translator 10.

In a preferred embodiment of the present invention the character recognition module 14 is operative to detect each individual character in a string of characters displayed in a first region on a display (not shown) which is selected by a user. The individual characters detected by the character recognition module 14 are provided to the word and phrase recognition module 16 which is operative to recognize, in the string of characters, a word or a phrase written in a first language.

It is appreciated that the word and phrase recognition module 16 may form part of a conventional word recognition module, such as a module which provides a spell-check in a word-processor, or any other suitable conventional word recognition module. The method of operation of the character recognition module 14 together with the word and phrase recognition 16 is described with reference to FIG. 3.

It is appreciated that the string of characters detected by the character recognition module 14 may be generated by any software program, such as a word-processor, and operating system, a text or hyper-text generating program or application, and any application program.

Preferably, the user may select a current data base to work with. The current data base may include the computerized dictionary data base 18, the computerized thesaurus data base 20, the graphical dictionary data base 22 or any combination thereof. In a preferred embodiment of the present invention the computerized misspeller dictionary data base 24 may be automatically accessed by the processor 12 if a word is not found in the current data base.

Alternatively or additionally, the current data base may include external dictionaries and/or data bases 37 which may be chained with the data bases 18, 20 and 22 respectively. Preferably, the external dictionaries and/or data bases 37 may be accessed by the processor 12 via networks, such as the Internet. It is appreciated that the external dictionaries and/or data bases may be accessed by the user upon request, or automatically, such as when a word or a phrase is not found in any of the data bases 18, 20 and 22.

Further additionally, the current data base may also include a personal user entered dictionary or data base which may include words, phrases and translations of words and phrases entered by the user. The personal dictionary or data base may preferably be stored in a storage device, such as a hard disk (not shown) accessible by the processor 12.

Alternatively or additionally, the user may update the data bases 18, 20 and 22 with words, phrases and translations of words and phrases that are not found in the data bases 18, 20 and 22 respectively.

If the current data base is the computerized dictionary data base 18, the processor 12 may be operative to determine whether there is an entry for the word in the computerized dictionary data base 18, to obtain, from the computerized dictionary data base 18, a translated word, representing a translation of the word in a second language, and to display the translated word at a second region on the display. It is appreciated that the second region may be located anywhere on the display. Preferably, the second region may be located near the first region in which the word is displayed, such as beneath the word, above the word, at the left of the word and at the right of the word. Alternatively, the second region may be located at one of the bottom, the top, the left side and the right side of the display, or in a tool-bar located at one of the bottom, the top, the left side and right side of the display. It is appreciated that the second region may be in a form of a tool-tip as is well known in the art.

If the current data base is the computerized thesaurus data base 20, the processor 12 may be operative to determine whether there is an entry for the word in the computerized thesaurus data base 20, to obtain, from the computerized thesaurus data base 20, at least one of a synonym and an antonym to the word in the second language, and to display the at least one of a synonym and an antonym to the word at a third region on the display.

If the current data base is the graphical dictionary data base 22, the processor 12 may determine whether there is an entry for the word in the graphical dictionary data base 22. It is appreciated that the graphical dictionary data base 22 may include at least one of pictures, drawings and icons which represent words. Preferably, each of the at least one of pictures, drawings and icons is associated with a word.

If the processor 12 determines that there is an entry for the word in the graphical dictionary data base 22, a picture which corresponds to the word is retrieved from the graphical dictionary data base 22 and is displayed at the second region on the display.

If the word cannot be found in any of the computerized dictionary data base 18, the computerized thesaurus data base 20 and the graphical dictionary data base 22, the processor 12 may search the computerized misspeller dictionary data base 24 for a match of the word to a misspelled word which is represented in the computerized misspeller dictionary data base 24, and display a corresponding correctly spelled word in the second language at a fourth region on the display.

It is appreciated that the pronunciation guide 26 and the phrase guide 28 may be accessed any time when a correct pronunciation of the word, or an example of a phrase in which the word is used, is required.

In another preferred embodiment of the present invention the string of characters which is detected by the character recognition module 14 and recognized by the word and phrase recognition module 16 may be a string of characters from a written document. In such a case, the computerized translator 10 may be operatively associated with a scanner 30 which is operative to scan the written document and to generate an image which includes a scanned text that represents the text written in the document. Preferably, the scanner is coupled to the processor 12 and is operative to provide the scanned text to the processor 12. It is appreciated that the scanner 30 may be external to the computerized translator 10.

When the user selects a region in the written document which includes a word, such as by placing a mouse pointer (not shown) on the region in which the word appears on the display, the processor 12 applies a character recognition procedure to detect the word and to recognize it. It is appreciated that conventional character recognition procedures that are commercially available may also detect and recognize hand-writing, and thus, if the written document includes a hand-written document, hand-written words may be also recognized.

Alternatively, the character recognition module 14, or the scanner 30 may include a character recognition procedure which enable detection and recognition of characters in an image which includes a scanned text. In such a case, the processor 12 provides data present in the region selected by the user to the character recognition module 14 or to the scanner 30. Preferably, the data present in the region selected by the user is processed in the character recognition module 14 or in the scanner 30 to detect each of the characters which form the word or a phrase which may include a few words. If detection of the word or the phrase takes place in the scanner 30, recognition of the word or the phrase may be also performed in the scanner 30. If detection of the word or the phrase takes place in the character recognition module 14, recognition of the word or the phrase may be performed in the word and phrase recognition module 16.

After the word or the phrase is detected and recognized, the word or the phrase is provided to the processor 12 which retrieves the following information: a translated word; a synonym or an antonym to the word; a picture which corresponds to the word or the phrase; and a correctly spelled word or phrase from the following data bases: the computerized dictionary data base 18; the computerized thesaurus data base 20; the graphical dictionary data base 22; and the computerized misspeller dictionary data base 24 respectively.

Preferably, information retrieved by the processor 12 may be provided to the text-to-speech module 32 which is operative to convert textual information to speech data. The speech data is preferably provided to the speaker interface 34 which converts the speech data to electric signals that may be employed by the speaker 36 to produce speech corresponding to the textual information. Thus, the user may receive a vocal representation of at least one of the following: the word or the phrase; the translated word; the synonym or the antonym to the word; and the correctly spelled word or phrase.

Preferably, the computerized translator 10 may be also operated as a server in a mode which provides access to multiple clients. In such a case, each of the multiple clients may preferably be operative to access any of the units comprised in the computerized translator 10, preferably via the processor 12.

Figure 2B:
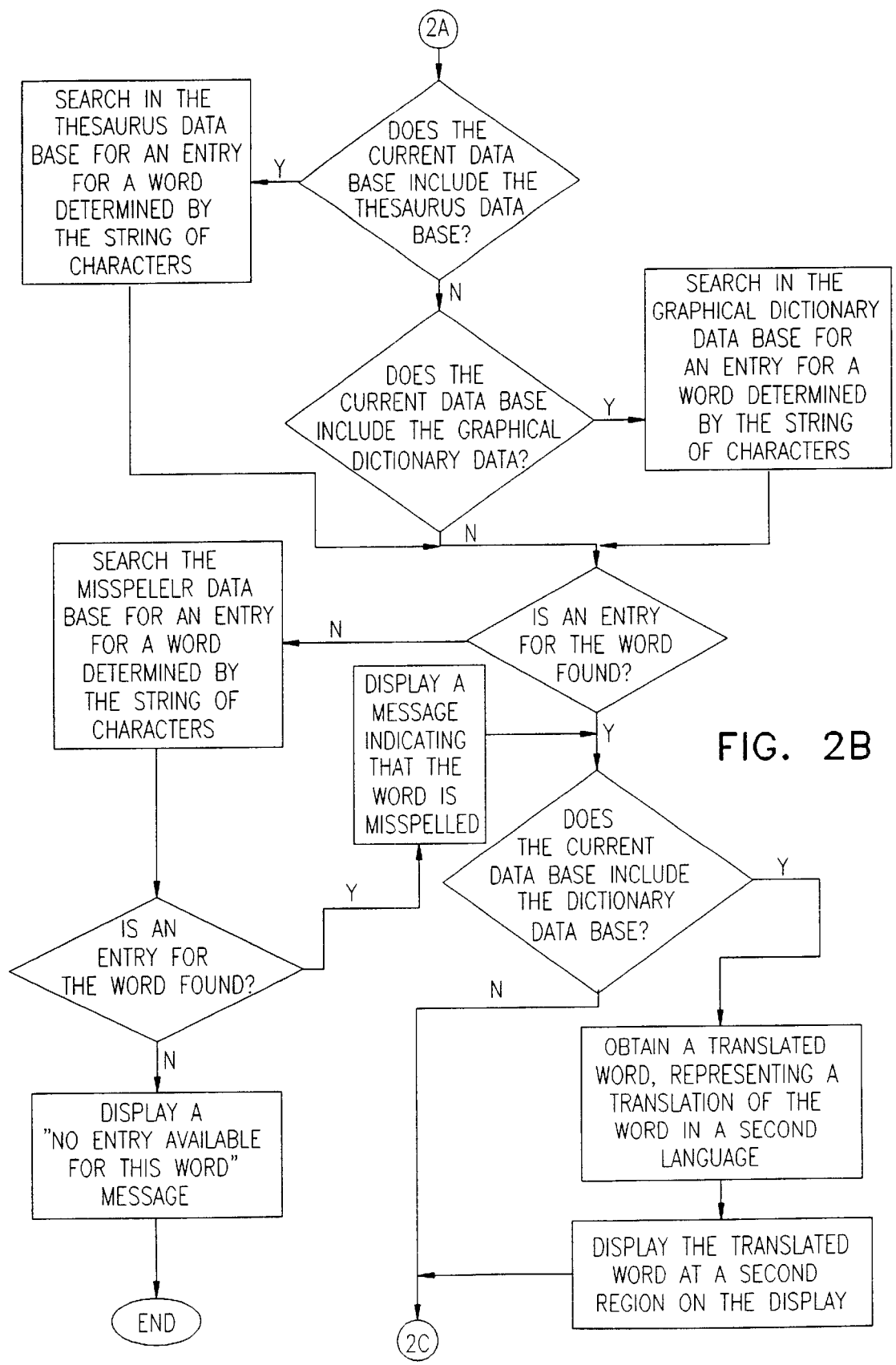
Figure 2C:
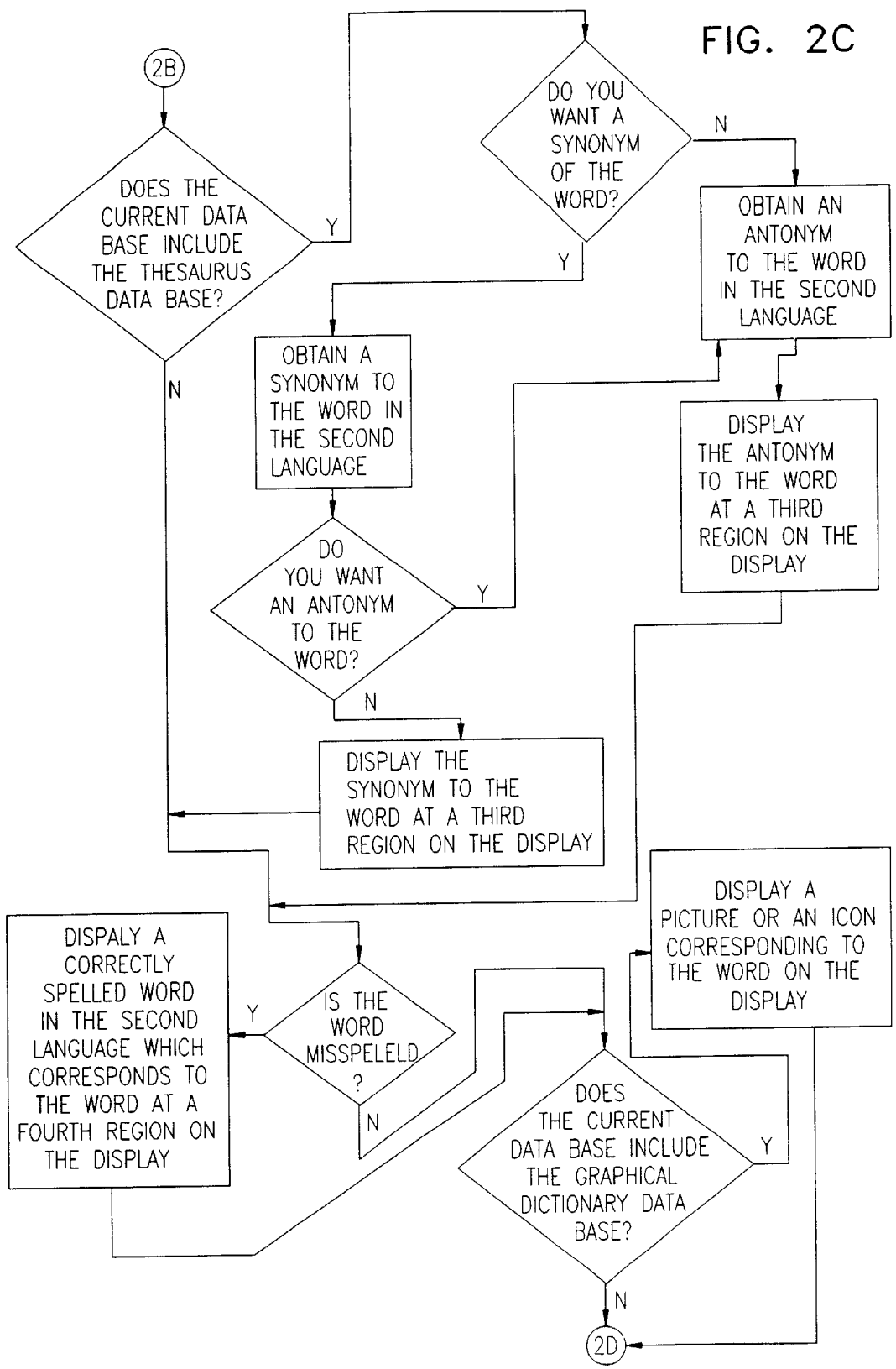
Figure 2D:
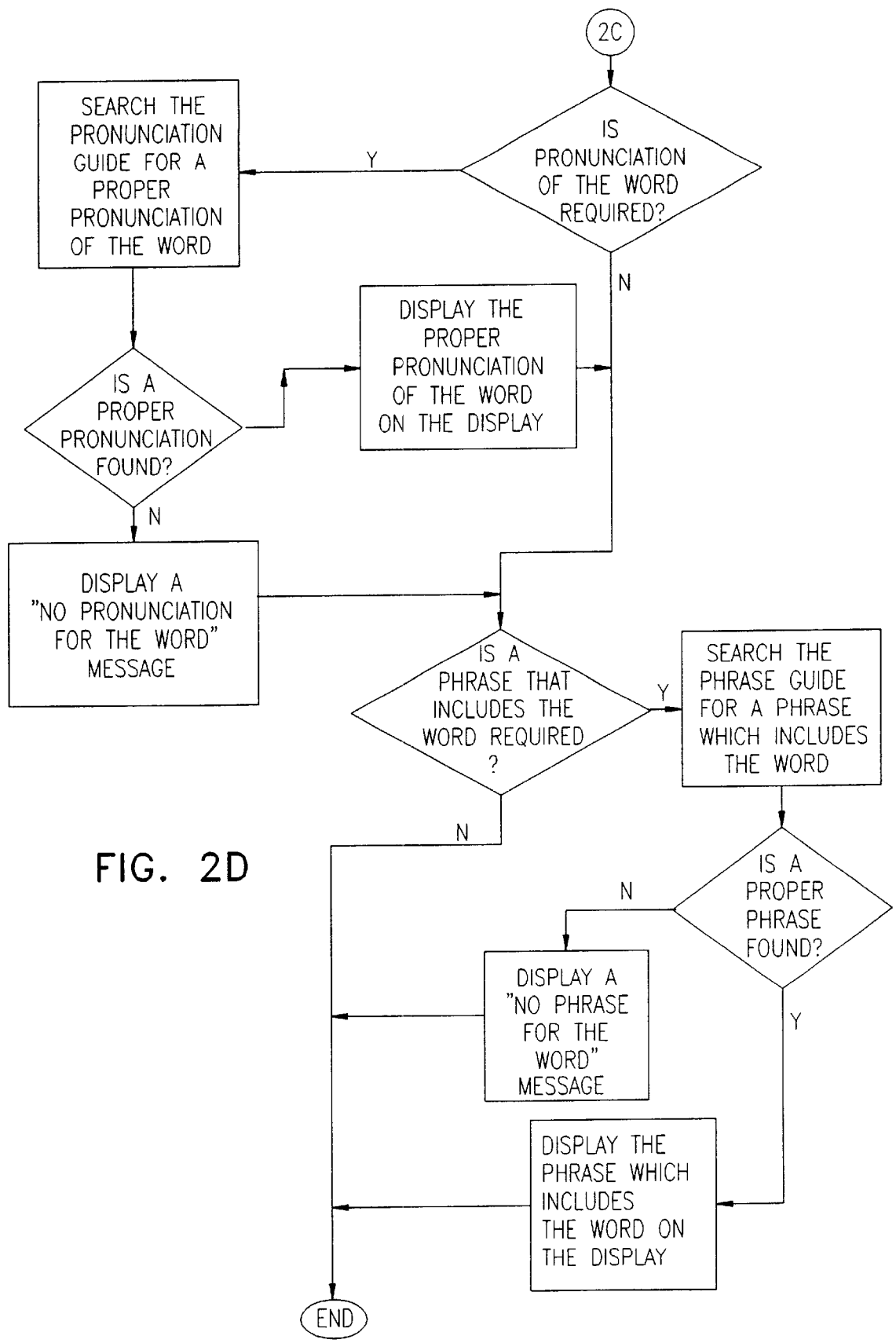

Reference is now additionally made to FIGS. 2A–2D which together constitute a generalized flow chart illustrating a preferred method for retrieving data from dictionary and thesaurus data bases which is operative with the computerized translator 10 of FIG. 1.

In a preferred embodiment of the present invention of a user who operates the computerized translator 10 is invited to select a current data base to work with. The current data base may include the computerized dictionary data base 18, the computerized thesaurus data base 20, the graphical dictionary data base 22, or any combination thereof.

Preferably, the user receives an indication of a selected current data base on a display, such as a conventional computer display. The indication may include an icon which is both color and letter coded, such that if the computerized dictionary data base 18 is selected, the icon may include a book-mark with a letter "D" printed inside the book-mark in a first color, and if the computerized thesaurus data base 20 is selected, the icon may include the book-mark with a letter "T" printed inside the book-mark in a second color. If the graphical dictionary data base 22 is selected, the icon may include the book-mark with a letter "G" printed inside the book-mark in a third color.

If both the computerized dictionary data base 18 and the computerized thesaurus data base 20 are selected, the icon may include a book-mark with no letters inside.

It is appreciated that other coding schemes may be selected which may include other marks printed in the icon and/or suitable color for each selection of a data base, and/or other letters or words which may replace the letters "D", "T" and "G".

Once the translator 10 is operated, and a current data base is selected, the user may mount a text on the display. It is appreciated that the text may include any form of computer generated text, such as a document from a word-processor, a text embedded in an icon, and operating instructions.

In a preferred embodiment of the present invention the text may include a written text which is scanned by the scanner 30 to provide an image of the scanned text which is mounted on the display. It is appreciated that the written text may include one of a hand-written document, a facsimile document or any printed paper. In such a case, the characters in the scanned text may be detected and recognized by the character recognition module 14, which may employ a conventional optical character recognition (OCR) procedure to identify each character and each group of characters that may form a word.

Once the text is displayed on the display, the user may place a mouse pointer (not shown in a FIG. 1) at a region on the display, such as the first region on the display. If the mouse pointer is placed to point the first region, and is not moved for a pre-selected period of time, such as for 5 seconds, the contents of the first region is preferably analyzed as described hereinafter.

If the first region is a blank area, a "NO TEXT HERE" message is displayed at the second region on the display. If the first region is not a blank area, a search is made for a text in the first region. If no text is found, such as when only a picture is displayed in the first region, an "UNRECOGNIZED WORD" message is displayed at the second region on the display. It is appreciated that when the first region includes a picture and a text, such as when the first region includes an icon which is pointed at by the user, the "UNRECOGNIZED WORD" message is not displayed and the text is considered a legitimate text for which the translator 10 provides a term from a dictionary or a thesaurus.

If a text is found, the text is analyzed to determine existence of a string of characters. The string of characters may be detected and recognized by the character recognition module 14. If the text forms part of a scanned text, or if the text is comprised in a combination of a picture and a text, such as an icon, and OCR procedure, which may be executed by the processor 12 or the character recognition module 14, may be operative to determine the characters in the string of characters.

Once the characters are detected and recognized in the character recognition module 14, the detected characters are provided to the word and phrase recognition module 16 in which the string of detected characters is recognized as a word or a phrase. To simplify the description, the string of characters is assumed to include a word.

Once the word is detected and determined, a search is made in the current data base for an entry for the word. It is appreciated that if the current data base includes more than one data base, such as the computerized dictionary data base 18 and the computerized thesaurus data base 20, more than one entry may be obtained for the word.

If an entry for the word which includes the string of characters is not found in any of the data bases 18, 20 and 22, a search is automatically made in the computerized misspeller dictionary data base 24. It is appreciated that the computerized misspeller dictionary data base 24 may include words which are frequently misspelled, common misspelling formats of such words and correct spelling of the these words.

If the word is not found in any of the data bases 18, 20, 22 and 24, a "NO ENTRY AVAILABLE FOR THIS WORD" message is displayed on the display and no further analysis of the word is performed.

If the word is found in the computerized misspelled dictionary data base 24, a message indicating that the word is misspelled is preferably displayed at the second region on the display, and a correctly spelled word which corresponds to the word replaces the word for further analysis. It is appreciated that the output of the searches in any of the data bases 18, 20, 22 and 24 results in a word which is correctly spelled irrespective of the current data base selected.

Once an entry for the word is found in any of the data bases 18, 20, 22 and 24 as mentioned above, a suitable output is obtained from the current data base. If the current data base includes the computerized dictionary data base 18, a translated word, representing a translation of the word in a second language, is obtained and the translated word is displayed at the second region on the display.

If the current data base includes the computerized thesaurus data base 20, at least one of a synonym and an antonym to the word in the second language is obtained, and the at least one of a synonym and an antonym to the word may be displayed at a third region on the display. It is appreciated that the user may select whether to obtain a synonym to the word, an antonym to the word or both, either when the current data base is selected to include the computerized thesaurus data base 20, or interactively, when the word is pointed at by the mouse pointer.

It is appreciated that the third region may be located anywhere on the display. Preferably, the third region may be located near the first region in which the word is displayed, such as beneath the word, above the word, at the left of the word and at the right of the word. Alternatively, the third region may be located at one of the bottom, the top, the left side and the right side of the display, or in a tool-bar located at one of the bottom, the top, the left side and the right side of the display. It is appreciated that the third region may be in a form of a tool-tip as is well known in the art.

If the word which is pointed at is found to be misspelled as mentioned above, the correctly spelled word which corresponds to the word is displayed at a fourth region on the display. It is appreciated that the correctly spelled word may be in the second language. The fourth region may be located anywhere on the display. Preferably, the fourth region may be located near the first region in which the word is displayed, such as beneath the word, above the word, at the left of the word and at the right of the word. Alternatively, the fourth region may be located at one of the bottom, the top, the left side and the right side of the display, or in a tool-bar located at one of the bottom, the top, the left side and the right side of the display. It is appreciated that the fourth region may be in a form of a tool-tip as is well known in the art.

If the current data base includes the graphical dictionary data base 22, a picture or an icon which corresponds to the word is preferably displayed at the second region on the display.

In addition to dictionary and thesaurus terms that may be associated with the word, a proper pronunciation of the word and a phrase which includes the word may be obtained. Preferably, if a proper pronunciation is required, the pronunciation guide 26 is searched for a proper pronunciation of the word. If the proper pronunciation of the word is not found, a "NO PRONUNCIATION FOR THE WORD" message is displayed on the display. If the proper pronunciation of the word is found, it is displayed on the display. In a preferred embodiment of the present invention, the proper pronunciation may be also provided vocally via the text-to-speech module 32, the speaker interface 34 and the speaker 36.

If a phrase which includes the word is required, the phrase guide 28 is searched for a proper phrase which includes the word. If the proper phrase is not found, a "NO PHRASE FOR THE WORD" message is displayed on the display. If the proper phrase is found, it is displayed on the display.

It is appreciated that the above mentioned method may be applied for each region that is pointed at in a displayed text, including program icons. Thus, when the mouse pointer is moved to a new location on the display, the same method is applied for the new location.

In another preferred embodiment of the present invention the second region, the third region and the fourth region may be provided in separate windows. In such a case, each of the separate windows may include additional information from the corresponding data bases, such as additional interpretations and translations of the word, additional synonyms and antonyms, additional pictures, and additional phrases which include the word.

Alternatively, at least two of the following regions: the second region, the third region and the fourth region, may include a common area, which may be in a form of a tool-tip near the first region or may include an area in a tool-bar at one of the bottom, the top, the left side and the right side of the display.

In another preferred embodiment of the present invention the first language may be identical to the second language. In such a case, the translator 10 is preferably transformed to an interpreter which provides a meaning of the word, a synonym and an antonym in the same language that the word is written.

Preferably, the above mentioned method for providing data from dictionary and thesaurus data bases may not be applied to words and phrases which are displayed in a dictionary window which displays definitions and/or translations to the words and phrases, and/or a thesaurus window which displays synonyms and antonyms to the words. Alternatively, the above mentioned method for providing data from dictionary and thesaurus data bases may be applied to words and phrases which are displayed in the dictionary window and/or the thesaurus window.

Reference is now made to FIG. 3 which is a generalized flow chart illustrating a preferred method for providing character and word recognition in accordance with a preferred embodiment of the present invention, the method being operative with the character recognition module 14 and the word and phrase recognition module 16 of the computerized translator 10 of FIG. 1.

In a preferred embodiment of the present invention a text which is displayed on a display may include a windows based text which is arranged in separate areas. The windows based text may be generated by a Windows Program such as, a Microsoft Windows 3.1™ program, a Microsoft Windows for workgroups 3.11™ program, a Microsoft Windows 95™ program, and a Microsoft Windows NT™ program.

Preferably, a word which is pointed at on the display is located in an area which is bounded by a bounding rectangle. Typically, the Windows Program uses a Windows Text-Drawing Function to arrange words and phrases in the bounding rectangle based on various parameters, such as formatting options.

Preferably, arrangement of words and phrases in the bounding rectangle may be performed directly by targeting the words and the phrases to the display. Alternatively, in some versions of Windows Text-Drawing Functions, data representing the words and the phrases may be provided to a memory buffer and retrieved from the memory buffer in one cycle or a plurality of cycles prior to outputting the words and the phrases to the display. Preferably, at the end of the cycle or the plurality of cycles, the words and the phrases may be outputted to the display and arranged in the bounding rectangle.

It is appreciated that the bounding rectangle may be of any size ranging from a size of a portion of a line to a full display screen size. Typically, the bounding rectangle and its dimensions are determined by the Windows Text-Drawing Function.

Once the text is arranged in the bounding rectangle, characters which form the words and phrases in the bounding rectangle, formats and fonts that are used for each character, and a language used for each character may be obtained. Additionally, the X, Y coordinates of the vertexes of the bounding rectangle, and the dimensions of the rectangle may be obtained.

In order to obtain a location of each character, a pixel-by-pixel scanning process of the bounding rectangle is performed. The scanning process provides locations of the characters, which together with the characters which form the words and phrases in the bounding rectangle, the fonts used for each character, and the language used for each character, enables to map and to determine each word and phrase, including the word which is pointed at. Thus, the word which is pointed at can be analyzed based on prior knowledge of the language, each of the characters which form the word, the fonts and the locations of the characters which form the word as determined by the scanning process.

Additionally, since neighboring words and phrases are also known, the word may be also analyzed based on the neighboring words and phrases. Preferably, an analysis based on neighboring words and phrases may include a grammar analysis of the word, the results of which may be displayed on the display.

It is appreciated that several advantages may be provided by the method for providing character and word recognition over conventional OCR methods. Since the method for providing character and word recognition is based on prior knowledge of the language which is used for each character, characters which have similar structures, but are written in different languages, such as "C" in English and "C" in Polish, may be separated and identified. It is appreciated that such identification is not possible if conventional OCR methods are employed.

Additionally, since all the words and phrases in the bounding rectangle are known, a word which is partly covered, such as by a window, may be also recognized and identified. Accordingly, if a partly covered word is pointed at, a translation of the word, a synonym to the word and an antonym to the word may be obtained from the corresponding dictionary and thesaurus data bases. It is to be appreciated that partly covered words cannot be identified by employing conventional OCR methods.

By employing prior knowledge of the fonts and formats of the characters, the method for providing character and word recognition may be employed to recognize and identify special characters, such as at least one of the following special characters: colored characters; bold characters; characters written in italics; characters having different sizes; characters having different font types; and overstrike characters. Additionally, the prior knowledge of the words and fonts may be employed to identify words when the characters which form the words are separated by spaces and in cases of overstrike of whole words.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable sub-combination.

It will be appreciated by persons skilled in the art that the present invention is not limited by what has been particularly shown and described hereinabove. Rather the scope of the present invention is defined by the claims which follow.

What is claimed is:

1. A method for providing computerized word-based referencing comprising:

indicating a target word on a display, thereby causing a computer to identify said target word on said display by employing at least one of a text drawing function and a character recognition function in order to automatically identify at least one entry for the target word in at least one computerized data base based on the target word and additionally based on at least one word appearing in a vicinity thereof on the display to eliminate ambiguity in meaning in the target word; and displaying the at least one entry for the target word from said at least one computerized database on said display.

2. A method according to claim 1 and wherein said at least one computerized database is accessed via the Internet.

3. A method according to claim 1 and wherein the target word is at a first region of the display, and said displaying comprises displaying at a second region of the display the at least one entry.

4. A method according to claim 1 and wherein said indicating comprises placing a pointer at the target word.

5. A method according to claim 1 and wherein said indicating includes performing a grammatical analysis of the target word based, at least in part, on the at least one word appearing in the vicinity thereof.

6. A method according to claim 1 and wherein said at least one computerized data base comprises a plurality of databases.

7. A method according to claim 6 and wherein said plurality of databases comprises at least one of the following: a computerized dictionary; a computerized thesaurus; and a graphical dictionary.

8. A method according to claim 6 and wherein said at least one entry is identified in one of said plurality of data bases.

9. A method according to claim 8 and wherein said one of said plurality of databases is accessed automatically.

10. A method according to claim 4 and wherein said one of said plurality of databases is accessed upon user request.

11. A method according to claim 1 and wherein the target word comprises a target phrase.

12. A method according to claim 1 and wherein said target word is in a first language and said at least one entry is in a second language.

* * * * *